May 21, 1963 G. L. SMITH 3,090,489
LADDER WITH INTEGRAL WATER SUPPLY
Filed Oct. 24, 1960 6 Sheets-Sheet 1
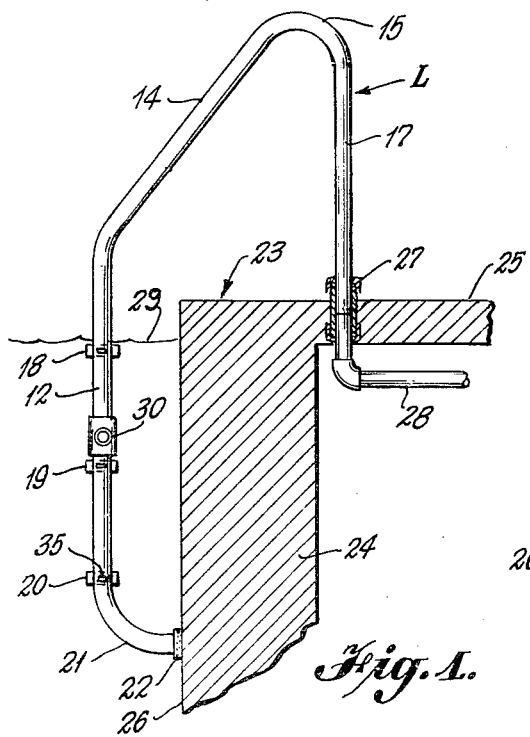
Fig. 1.
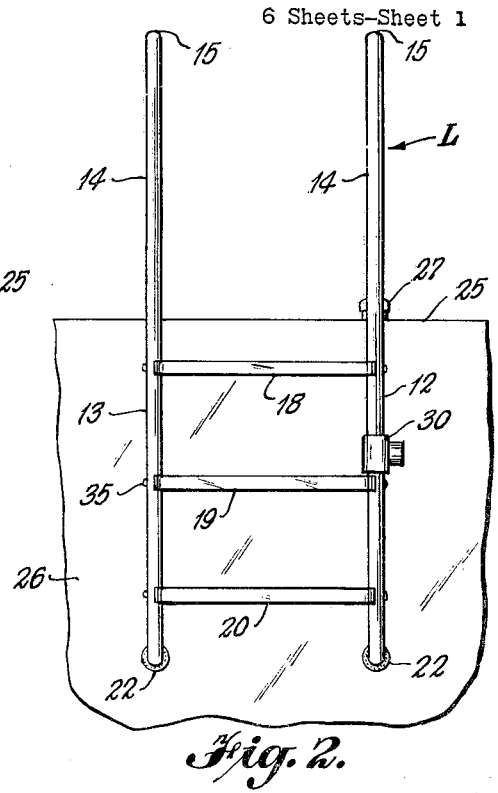
Fig. 2.
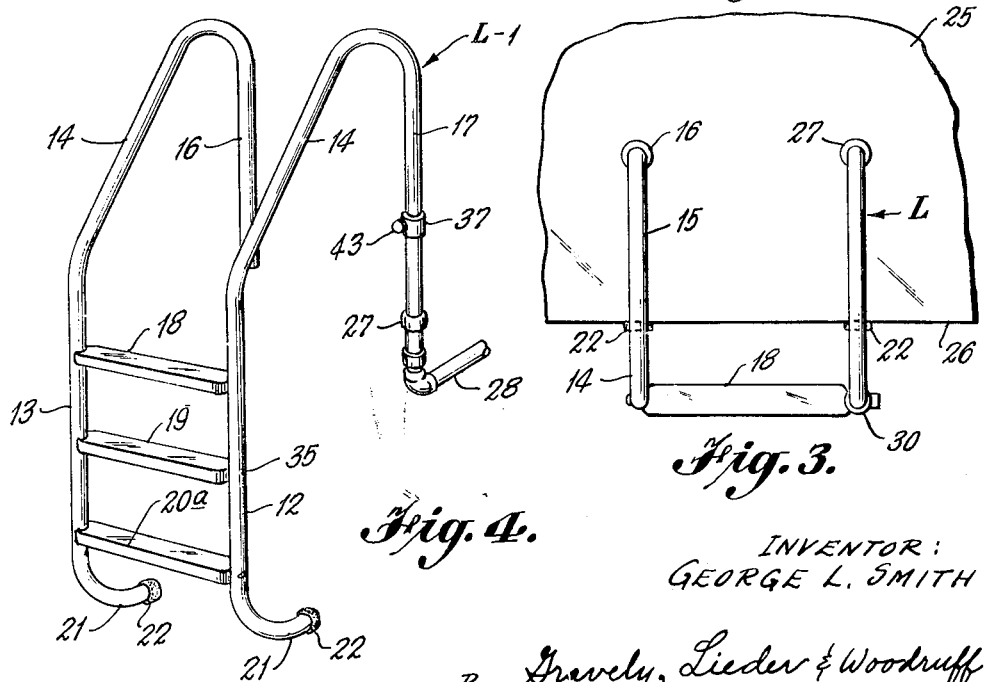
Fig. 4.
Fig. 3.
INVENTOR:
GEORGE L. SMITH
By Gravely, Lieder & Woodruff
ATTORNEYS,

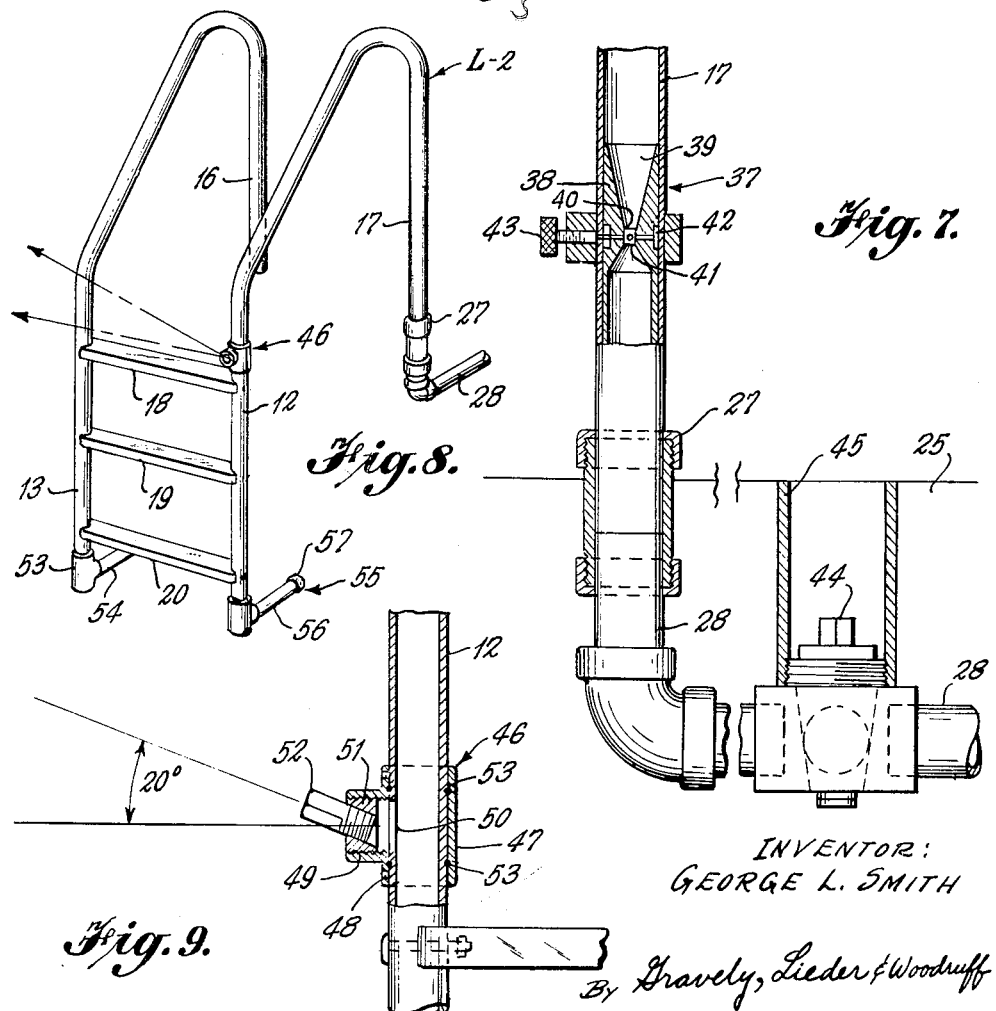

May 21, 1963
G. L. SMITH
3,090,489
LADDER WITH INTEGRAL WATER SUPPLY
Filed Oct. 24, 1960
6 Sheets-Sheet 3
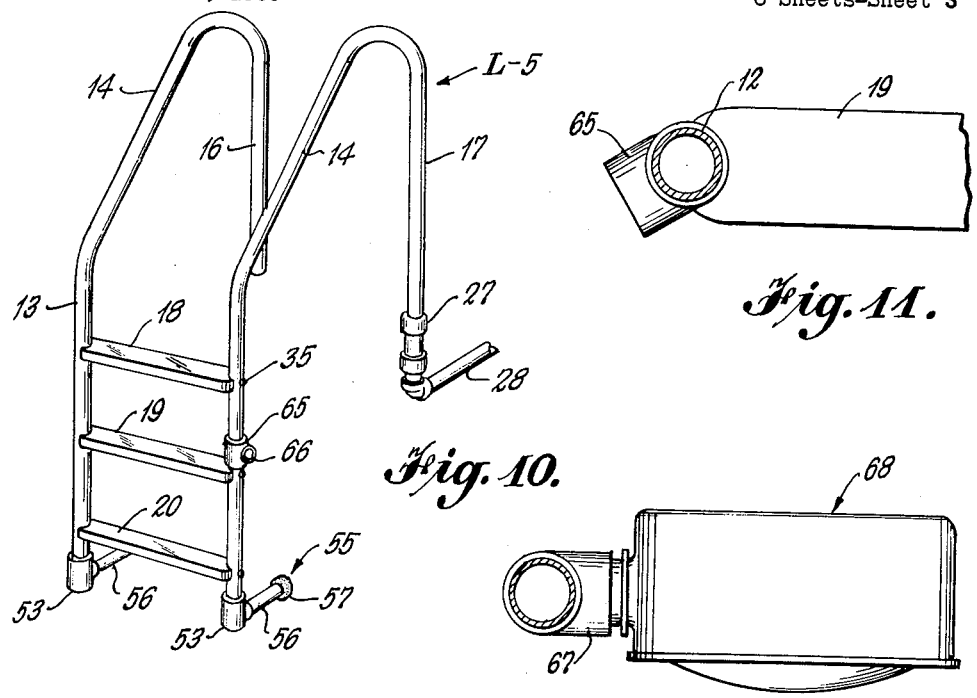
*Fig. 10.*
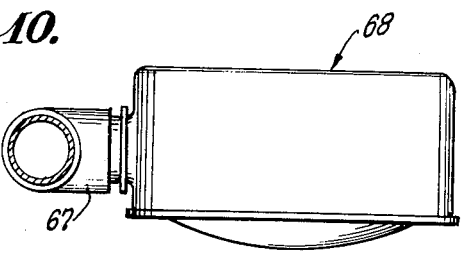
*Fig. 11.*
*Fig. 13.*
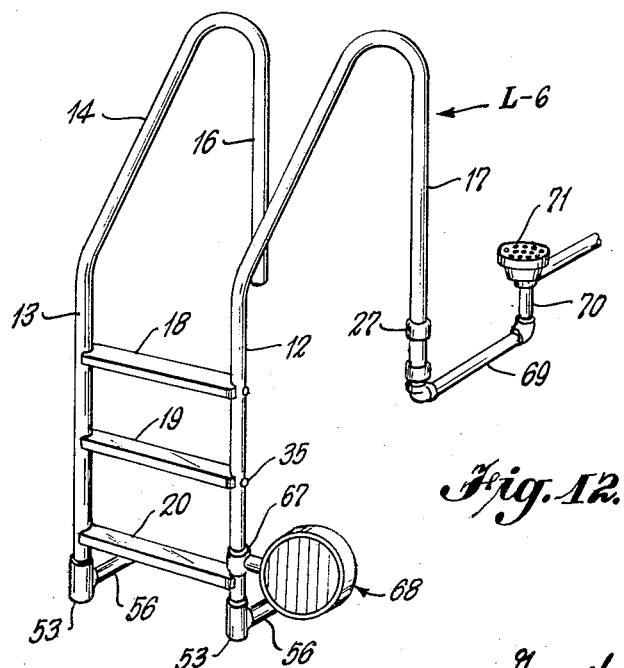
*Fig. 12.*
INVENTOR:
GEORGE L. SMITH
By Gravely, Lieder & Woodruff
ATTORNEYS.

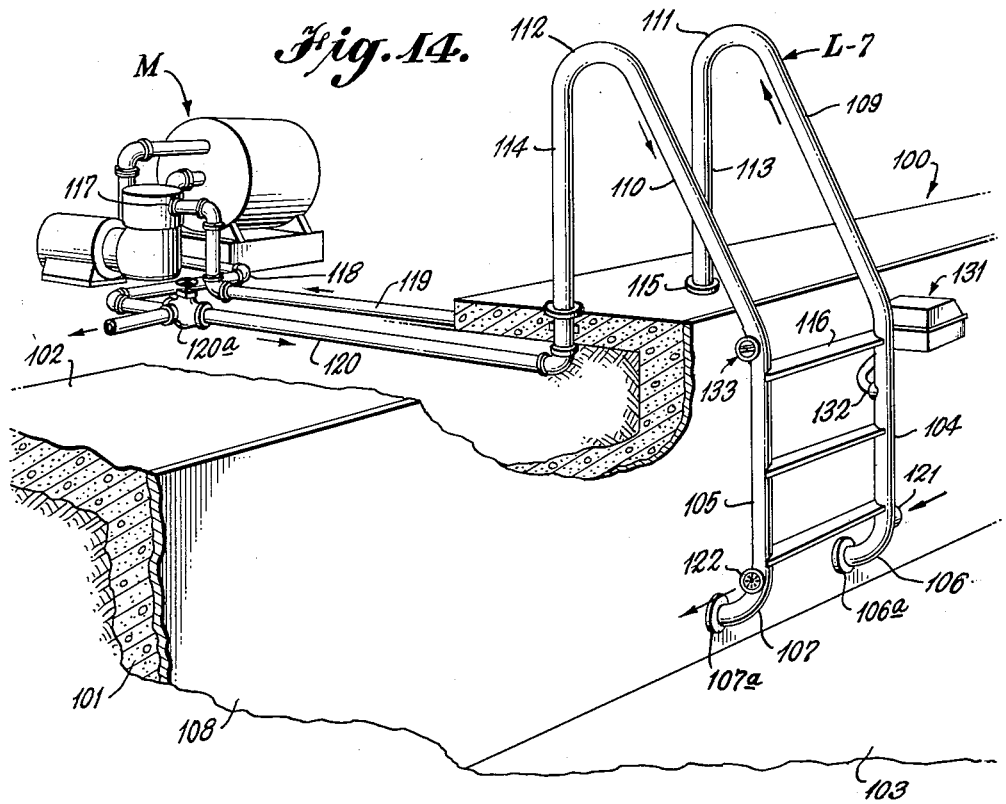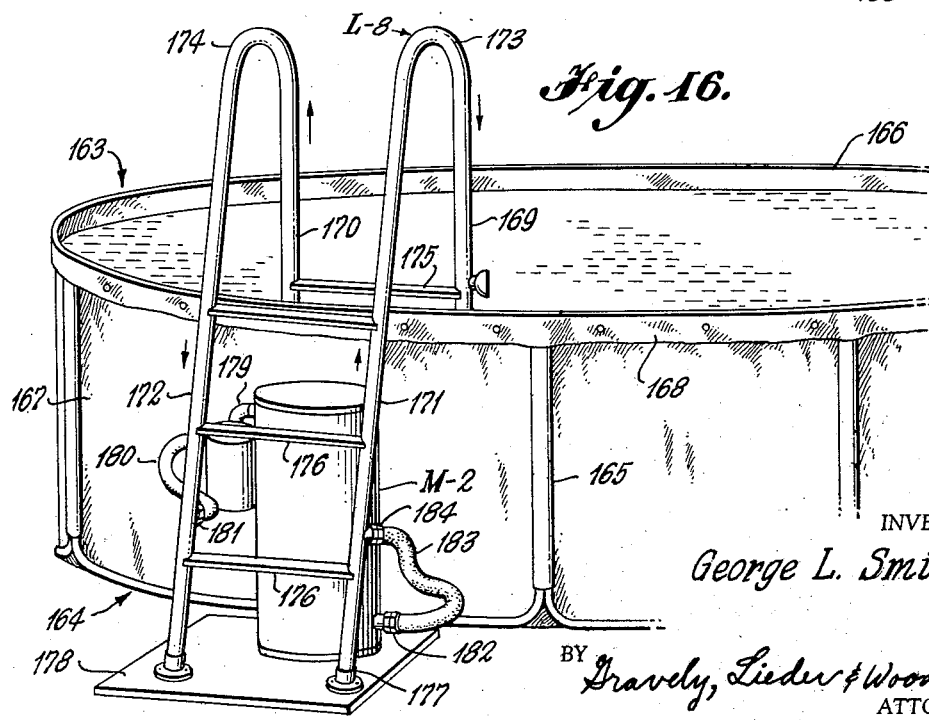

May 21, 1963 G. L. SMITH 3,090,489
LADDER WITH INTEGRAL WATER SUPPLY
Filed Oct. 24, 1960 6 Sheets-Sheet 5

INVENTOR:
George L. Smith
BY Gravely, Lieder & Woodruff
ATTORNEYS

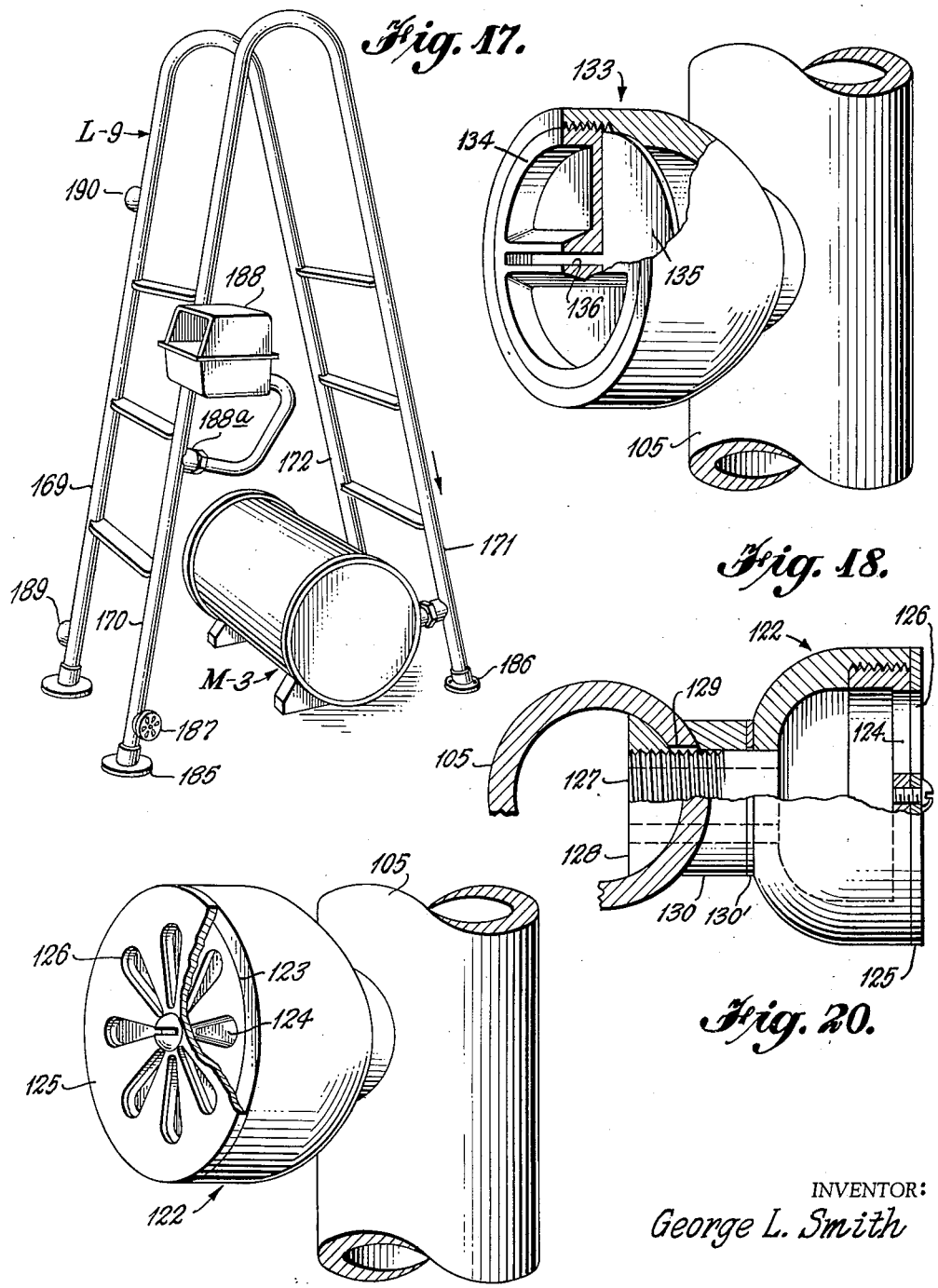

United States Patent Office 3,090,489
Patented May 21, 1963

3,090,489
LADDER WITH INTEGRAL WATER SUPPLY
George L. Smith, 13 Outer Ladue, St. Louis, Mo.
Filed Oct. 24, 1960, Ser. No. 67,447
10 Claims. (Cl. 210—169)

This invention relates to swimming and bathing pools and is directed particularly to an accessory structure and system for use in connection therewith.

This application is a continuation-in-part of my application Serial Number 852,520, filed November 12, 1959.

The present invention more specifically has to do with the provision of a swimming and bathing pool accessory and system, a particular and important object of which is to provide an economical means whereby all of the functions of good pool sanitation and maintenance may be performed or carried out.

Bathing and swimming pools of the type generally constructed as fixed installations for both home and public use are extremely expensive to install. A considerable, if not major, portion of the expense involved in the construction of bathing and swimming pools goes into the piping system and the filtering and circulating apparatus associated therewith. In the construction of cement pools it is necessary that a rather involved piping system be installed whereby the water of the pool can be continuously withdrawn and passed through a filtering or cleaning system and returned in fresh condition to the pool and such systems also include means for cooling the water by spray attachments together with means for skimming off floating material from the surface of the pool and with other means for vacuuming the bottom of the pool. In addition to these features, frequently many other accessory elements are employed. Furthermore, it is a general practice to locate the filtering apparatus together with the pumping mechanism at some distance from the pool where such apparatus may be housed and this further involves the use of a considerable amount of piping.

All of the foregoing features of construction associated with swimming pools as at present generally constructed are in addition to the means provided in the form of a ladder or ladders to facilitate the entrance into and exit from the pool by swimmers or bathers, which ladders have grab rails associated with the upper ends thereof.

A further and important object of the invention is, accordingly, to provide new and novel equipment in a form for ready installation or for convenient installation in bathing and swimming pools of all types whether of the in-the-ground form or of the above-ground form, whereby all of the functions now performed by built-in installations can be performed in a satisfactory and economic manner.

A further object of the invention is to provide a combination swimming pool ladder and circulating and filtering system for easy and inexpensive installation in any type of swimming or bathing pool, whether the pool be of the built-in concrete form sunken in the ground or a pool of any form standing or resting upon the surface of the ground and wherein such system involving the ladder and circulating and filtering means is characterized by low cost of installation and simplicity of operation.

A still further object of the invention is to provide a novel system combining the features of a swimming pool ladder and water circulating and filtering mechanism, for any and all types of swimming and bathing pools, which is of extreme simplicity such that a residence owner or other nonprofessional person can readily install the same and maintain clean and properly filtered water in the pool and the system is further characterized not only by being easy to install but by being easily disconnected for storage or removal to other locations, economical to manufacture and efficient in operation.

It is a further object of the present invention to provide a system having combined therewith a pool ladder and filtering and circulating means operatively coupled with the ladder, whereby surface skimming of the pool may be effected when desired and additionally, whereby the pool bottom may be effectively vacuumed to remove sediment therefrom.

It is a further object of the present invention to provide in a new and novel system a tubular ladder structure either of a type having a single series of steps leading to an upper grab rail, or of a type in the form of a stile operatively connected with a water circulating mechanism and filtering means, with a means carried by or connected with the ladder structure whereby water may be withdrawn from the pool through one side of the ladder structure and returned through the other side thereof to be returned to the pool in the form of a shower spray.

It is an additional object to provide other forms of attachments for the ladder structure whereby a vacuum tube may be coupled with one tubular side of the ladder so that the power apparatus or machinery employed for withdrawing water and returning it to the pool or, in other words, for circulating the water, may be employed for cleaning up the pool bottom by suction or vacuum action.

Other novel features of the present invention associated with the ladder structure forming a part of the system embody a means for aerating the water after the same is filtered and as it is being returned to the pool so as to fill the same with air bubbles to create a sparkling effect in the water; a means for spraying the filtered and returning water through steps of the ladder; a means of coupling a lighting unit with a side member of the ladder so that electric wiring can be carried through one of the tubular sides of the ladder to the lighting unit and a means forming a part of the side members of the ladder whereby adjustment of the ladder with respect to an adjacent face of the pool wall can be easily effected, where the system is installed in a cement pool, so as to set the ladder accurately in a vertical position.

A still further object of the invention is to provide in a unitary system a tubular stile structure and a water circulating and filtering mechanism, designed for use in association with a surface type swimming or bathing pool and whereby all of the various hereinbefore referred to functions may be readily performed and which system may be placed in position for use and removed if and as desired without in any way altering the form or construction of the pool with which it is associated.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

In the drawings:

FIG. 1 is a view in side elevation of one embodiment of the present invention showing the same set up for use in a permanently installed type of swimming pool, a portion of the wall and deck of the pool structure being in section and illustrating in section a coupling means between tubular elements of the structure, and the structure embodying a vacuum connection.

FIG. 2 is a view in front elevation of the structure shown in FIG. 1.

FIG. 3 is a view in top plan of the structure of FIG. 1.

FIG. 4 is a perspective view of a second embodiment of the invention with which an aerating means is associated.

FIG. 5 is a view on an enlarged scale, partly in top plan and partly in horizontal section of a hollow step for the ladder structure and designed to function as an aerator, side members of the ladder being shown in transverse section.

FIG. 6 is a view in side elevation of the aerator step with portions of the same broken away and showing the manner of securing the step to side members of a ladder.

FIG. 7 is a view partly in section and partly in elevation of portions of one side of a ladder structure showing an aspirator installed in the ladder side member and also illustrating a shutoff valve.

FIG. 8 is a view in perspective of a third embodiment of the invention wherein a spray means is associated with one side member of the ladder.

FIG. 9 is a sectional detail of the spray means.

FIG. 10 is a view in perspective of another or fourth embodiment of the invention illustrating the vacuum fitting and support or brace means for the lower ends of the side members of the ladder.

FIG. 11 is an enlarged top plan view of the vacuum fitting in a different position from that shown in FIGS. 1 and 10, the supporting side member of the ladder being in transverse section and showing a portion only of an adjacent step.

FIG. 12 is a view in perspective of another or fifth embodiment of the invention showing means associated therewith for providing an underwater light.

FIG. 13 is a view in top plan of the light unit showing its attachment to the side member of the ladder, which side member is in transverse section.

Figure 15:
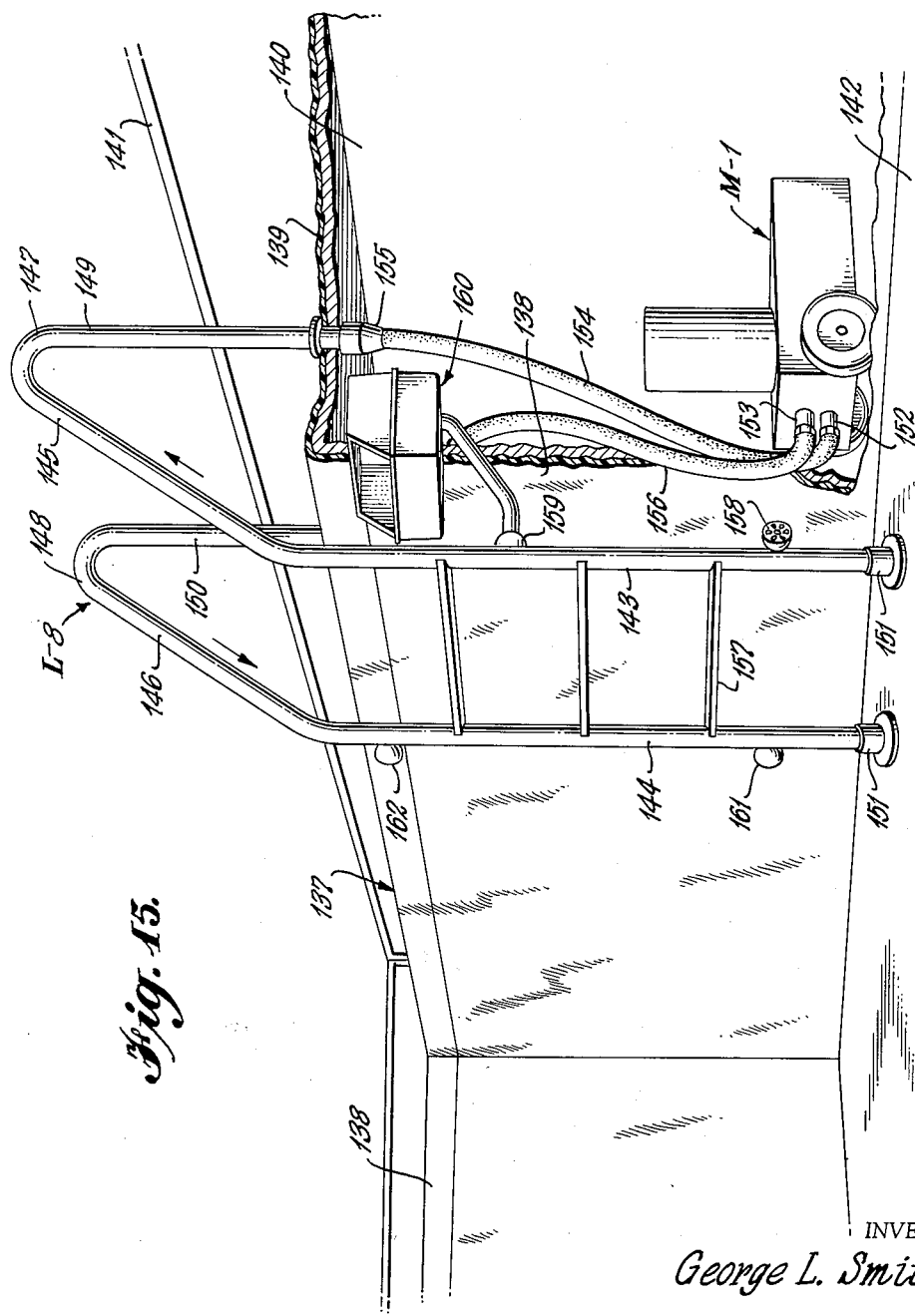

FIG. 14 is a view in perspective showing a ladder structure embodied in the system for withdrawing water from the pool, filtering the same and returning it to the pool and illustrating a number of different fittings for performing as many functions in connection with the care of the pool, the ladder structure here being shown as an installation in a cement pool structure with portions of the ladder broken away.

FIG. 15 is a view in perspective showing the ladder structure as a unit of the system installed in one surface type pool embodying a raised or elevated deck structure beneath which units of the system may be housed, portions of the pool structure being shown broken away.

FIG. 16 is a view in perspective illustrating a stile type of the invention as a unit of the system for use in association with another form of surface type pool.

FIG. 17 is a view in perspective of a stile type unit showing another arrangement for the pumping and filtering mechanism and illustrating a skimmer unit in association therewith.

FIG. 18 is a perspective view on an enlarged scale partly in section illustrating a spray fitting on the return side of the ladder structure.

FIG. 19 is a perspective view on an enlarged scale with parts in section illustrating an adjustable return feed fitting and/or suction fitting.

FIG. 20 illustrates partly in section and partly in elevation one of the fittings and showing a preferred manner for detachably securing the fittings to the tubular supports.

Referring now more particularly to the drawings, it will be seen that the present invention embodying a new and novel system as an accessory for a bathing or swimming pool of any one of the several different types in use, has incorporated therein various types of structures for performing a multiplicity of functions. By means of this new and novel system embodying the several types of structure for performing a number of functions the various hereinbefore stated objects of the invention may be attained.

FIGS. 1 to 3 inclusive illustrate one embodiment of the invention as comprised in the ladder unit part wherein the ladder unit is generally designated L. This ladder unit comprises the two hollow or tubular side members or uprights 12 and 13, each of which merges into an obliquely extending upper portion or grab rail 14. The grab rail has an upper end which merges into a reverse bend 15 and this joins or merges into a straight downwardly extending stanchion portion which at one side of the ladder structure is designated 16, while at the opposite side such stanchion portion is designated 17.

The vertical side portions 12 and 13 of the ladder structure have secured therebetween a number of steps or treads here shown as three in number and designated 18, 19 and 20.

In practice the structure is made so that the steps or treads may be disconnected from the side members 12 and 13 to allow the entire structure to be shipped in knocked down form. Also, the material used in the ladder structure should be tough or rigid, corrosion resistant and of a character to maintain an attractive appearance. For these purposes stainless steel is the preferred material for use.

The lower ends of the side members 12 and 13 of the ladder are shown as being continued in the curved bracing or spacing legs 21, each of which has secured to the end thereof or has fitted into the end thereof a foot piece 22, the function of which will be understood from the following description.

In FIGS. 1 to 3 a portion of a pool structure generally designated 23, is illustrated in vertical section which comprises a vertical wall 24 joined at its top edge with a horizontal deck 25.

The ladder structure when set up for use in the pool has the side members 12 and 13 disposed in vertical position adjacent to the face or inner surface 26 of the wall 24 with portions of the side members extending above the surface 29 of the water and with the obliquely extending grab rails 14 projecting upwardly as shown above the deck. The vertical stanchions 16 and 17 are directed downwardly toward the deck surface as shown and the stanchion 17 which, of course, forms one of the supports for the ladder structure, has the lower end thereof joined to a special fitting or deck anchor 27 which is installed in the concrete deck in the manner shown and which facilitates the detachment of the stanchion when desired so that the ladder structure may be removed.

In practice the ladder, when set up, will have the lower end of the stanchion 17 fixed in the fitting 27 and the lower end of the opposite stanchion will be suitably mounted upon a deck or otherwise secured in place.

As hereinbefore set forth, the ladder structure in the different embodiments illustrated, is equipped with a number of different fittings whereby certain functions may be performed. These different fittings will be described in the succeeding figures in association also with a compact pumping and filtering mechanism.

In the forms of the ladder units embodied in FIGS. 1 to 13 no illustration is given of the pumping and filter-mechanism but such mechanism is disclosed in FIGS. 14 to 20 and its connection with the ladder structure will subsequently be described in connection with the last mentioned figures.

The ladder structure illustrated in FIGS. 1 to 3 incorporates in the side member or upright 12 thereof a fitting 30 of a suitable character for connection therewith of a cleaning hose, whereby pool water may be drawn through the upright and through a hose attached to the fitting to facilitate cleaning the bottom of the pool. For such use the pipe line 28 would be connected to the pumping and filtering apparatus. In the following FIGS. 4 to 15, the ladder structure or ladder unit is illustrated equipped with a number of different fittings. In these figures the same reference characters will be employed for designating those parts of the ladder structure which are the same or which are common to all of the figures to thereby avoid unnecessary repetition of the description with the one exception that a different general designating character will be employed for the different embodiments in which the various fittings are incorporated.

In FIGS. 4 to 6, the embodiment of the ladder structure shown is here generally designated L–1. In this embodiment means is provided for aerating the water, either fresh water being introduced into the pool, or filtered water being returned thereto. Such means for effecting the aeration of the water consists in providing a lower step or tread, here designated 20a, as a hollow body or casing having a chamber 31 and having the bottom wall 32 thereof provided with a number of apertures 33.

Any suitable means is provided for securing the step or tread 20a between the side members or uprights 12 and 13 of the ladder structure, such securing means here being illustrated as comprising downwardly extending lugs 34 formed integrally with the bottom wall 32 of the step casing and positioned against the inner sides of the hollow side members and secured thereto by bolts 35.

The water supplied to the tubular side member 12 passes through an opening in the wall of such side member as indicated at 36 into the open end of the step 20a, which open end is fitted against the upright and covers the opening 36 as illustrated in FIG. 6.

The hollow upright 12 has fitted therein an aerating device which is generally designated 37 and which is partly illustrated in FIG. 7 herein. This device 37 comprises the elongate cylindrical body 38 having the venturi passage 39 therethrough. The throat 40 of the venturi has an opening 41 leading thereinto from an air channel 42 formed in the outside of the body 38, which is in communication with the atmosphere and into which the admission of air from the atmosphere is controlled by a suitable needle valve 43. Thus water flowing through the hollow upright, as it passes through the venturi, will suck air in at the throat of the venturi and such air will be mixed in with the water and the water will be discharged into the pool by way of the apertured hollow step 20a.

There is also illustrated in FIG. 7 a control valve generally designated 44 which is inserted into the pipe 28 for closing the latter when desired. Such valve may be located to be accessible from the top of the deck 25 by way of the enclosing sleeve 45 set into the deck structure.

FIGS. 8 and 9 illustrate another fitting in the ladder structure, which structure is here generally designated L–2. The fitting here shown is a spray fitting which is generally designated 46 and is shown mounted on the ladder side member 12 to be positioned several inches above the normal water level of the pool. This spray fitting 46 embodies a sleeve 47 surrounding the upright 12 and having secured thereto by screws 48, an internally threaded nipple 49, which communicates with an opening 50 in the wall of the upright 12 as shown. A threaded member 51 is engaged in the nipple 49 and carries the removable nozzle 52 which is disposed obliquely to the axis of the nipple as illustrated. As here shown the nozzle 52 is set to spray water upwardly at approximately a 20° angle from the horizontal into the pool. This aerates the water. The spraying operation may be carried on at night so as to reduce the temperature of the water. This reduction may be as much as 5° F., although this will vary with conditions.

The fitting sleeve 47 is provided with O rings 53 to prevent the leakage of water around the fitting.

In the hereinbefore described embodiments of the ladder structure lower ends of the side members or uprights are shown as being closed by the plugs 22. In the embodiment shown in FIG. 8 and in the succeeding figures the side members 12 and 13 are connected with T-couplings or unions 53 and these unions are provided with plugs in the lower ends of the cross arm portions thereof, at 54, the plugs not being shown, whereby to prevent water intended to be ejected through the spray fitting 46 from passing out of the lower ends of the uprights.

The lower ends of the uprights 12 and 13 in this FIG. 8 and other figures are shown with a wall engaging support or spacer by means of which the uprights can be accurately set in a vertical position and firmly braced against the adjacent face of the pool wall.

The numeral 55 designates an arrangement whereby the lower ends of the side rails may be assured of good bracing support against the wall surface. This arrangement consists in providing a length of tubular or pipe material 56 with one end fixed in the lateral arm of the T-coupling 53 and extended inwardly toward the wall and having a suitable foot member 57 on the other end for engagement against the wall surface. With this arrangement it will be seen that the spacer member 56 can be cut to the desired length to effect the bracing of the upright or side member of the ladder at the proper distance from the wall face.

The ladder structure generally designated L–5 in FIG. 10 has the lower ends of the side members or uprights 12 and 13 connected to bracing and spacer means like that shown and described in connection with FIG. 8. Also in this construction the side member 12 of the ladder is provided with a vacuum fitting which is generally designated 65 and which is provided with a removable closure plug 66. This vacuum fitting is preferably installed about 10″ below the water level of the pool. When it is desired to vacuum clean the pool to remove foreign substances from the bottom the plug 66 is removed and a suitable hose and vacuum cleaner head is connected to the fitting and the valve means, not shown, hereinbefore referred to is then opened so as to establish suction whereby the material removed from the bottom of the pool will be drawn off through the pipe line 28.

FIG. 11 illustrates the vacuum fitting 65 on a larger scale.

In place of connecting a vacuum cleaning hose to the fitting 65, a floating type skimming device, not shown in this FIG. 10, may be connected therewith whereby to keep the pool surface free of foreign material. Such a vacuum fitting is shown and described in connection with the further modified forms of the ladder structure, hereinafter illustrated and described.

In place of the various fittings hereinbefore described for controlling or modifying the flow of water into or from the pool a side rail or upright of the ladder structure may be equipped with a light fixture. Such a modification of the light structure is shown in FIG. 12 where the ladder structure is generally designated L–6. As here shown the side member or upright 12 has mounted thereon adjacent to the lower end thereof, a light fitting which is generally designated 67 and which is attached to have coupled therewith an underwater light unit 68. The side member 12 in this case acts as a protective housing for suitably insulated electric wiring (not shown), by means of which electric current may be supplied to the lighting element (not shown) within and forming a part of the unit 68. No water or other material such as chemicals or the like would be conducted through the upright 12 and the tubular portions connected therewith when electric wiring is run through these parts of the structure. Also, when the electric wiring is used in the hollow elements of the structure, hollow steps or other parts having openings, would be suitably plugged so as to prevent moisture from coming in contact with the wiring.

In place of the water pipe 28 hereinbefore described, connected with the lower end of the stanchion 17 by means of the fitting 17, a pipe 69 is provided connected at one end to the coupling fixture 27 and having its other end connected to an upwardly extending pipe or conduit 70 which is joined at its top end to a deck junction box 71, supplied with electric current from a suitable source.

In conventional swimming pool construction where underwater lighting is desired the pools had to be fabricated with special openings and housings in the vertical wall faces thereof. This is an expensive item in pool construction and also leads to difficult electrical installation and maintenance. The present ladder or swimming pool accessory here shown in FIG. 12 avoids these undesirable features, since the lighting unit is supported in the water on the ladder structure and does not have to be installed in the wall of the pool.

The housing portion of the light unit 68 will be provided with a sufficient amount of extra wire coiled up therein so that when the pool is emptied the light unit may be disconnected from the light fitting and placed on the deck so as to permit opening the casing for replacement of a lighting element or broken lens, as may be required.

In FIG. 14 the ladder structure is generally designated L-7. This ladder structure forms a part of a circulating system which includes a pumping and filtering mechanism of a suitable design or construction, which is generally designated M.

The ladder structure L-7 is shown in association with a conventional or standard in the ground bathing or swimming pool, generally designated 100. Numeral 101 designates one of the walls of the pool which is joined at the top with the concrete deck 102 while a portion of the bottom of the pool is shown and designated 103.

The ladder structure comprises the right and left hand tubular portions 104 and 105 respectively which, as in a previously illustrated and described structure, may have lower end portions 106 and 107 curved to form spacing and supporting legs to bear against the face 108 of the pool wall 101.

Each of the side members 104 and 105 is formed integral with and merges into an obtusely angled upper end portion forming a grab rail, which grab rails are designated 109 and 110 and these rails at their upper ends merge into the reverse bends 111 and 112, which in turn join the downwardly extending stanchions 113 and 114.

The ladder structure when set up for use will have the feet 106a and 107a at the lower ends of the bracing legs positioned on the face of the wall as previously stated and each of the tubular stanchions 113 and 114 will have its lower end secured in the special fitting or deck anchor of the type hereinbefore described and each of such couplings is here generally designated 115. When the lower ends of the stanchions are so secured in the fittings or couplings 115 which are embedded in the concrete deck 102 the ladder will be maintained in the proper spaced relation with the face of the pool wall so that the side members 104 and 105 will be vertically disposed.

The side members 104 and 105 have secured thereto and mounted therebetween the desired number of steps or treads, which steps or treads are here designated 116.

As hereinbefore stated, a combined pumping and filtering unit is combined in the system with the tubular ladder structure and such combination pumping and filtering mechanism may be of any suitable construction and therefore no details of the same as to its specific construction are shown or believed to be necessary to a proper understanding of the present invention. However, such mechanisms obviously must have a fluid inlet and a fluid outlet and such inlet and outlet means are designated respectively 117 and 118.

One of the tubular side members of the ladder is connected through the medium of the coupling 115 with the mechanism inlet or suction side by a pipe line 119 while the other or outlet side of the mechanism is connected with the other tubular side member of the ladder by the conduit or pipe 120. In the illustration here given the stanchion 113 has the conduit or pipe line 119 connected therewith while the other side of the ladder structure has the stanchion 114 connected with the conduit or pipe line 120.

The upright or vertical side member 104 of the ladder has connected therewith adjacent to the lower end thereof a fitting 121 through which water may be drawn from the pool through the pipe 119 to be filtered and returned to the pool. The other or opposite member or upright 105 of the ladder has connected therewith adjacent to its lower end, an adjustable fitting 122 by means of which filtered water may be returned by way of the pipe 120 to the pool.

This fitting 122, as shown in FIG. 19, may be designed so that it can be opened or closed as desired and accordingly the structure illustrated in FIG. 22 shows the fitting as having an end wall 123 provided with openings 124 and rotatably supporting an apertured control plate 125, the apertures of which are designated 126. By rotating the control plate 125 the outlet openings 124 may be opened or closed as desired.

The suction fitting 121 which is mounted on the upright 104 is faced in the opposite direction from the fitting 122. Accordingly, with this arrangement a good circulation of water in the pool can be maintained as it will be drawn toward the fitting 121 from the direction of one end of the pool and it will be returned into the pool toward the opposite end thereof after passing through the filtering mechanism.

The form of fitting illustrated in FIG. 18 is shown in FIG. 20 partly in section with a portion of the supporting tubular upright to illustrate a preferred manner of attaching this and oher fittings to their respective uprights. Accordingly, while the reference character 122 has been used in this figure and other elements of the structure shown in FIG. 18 have been illustrated, showing of the mounting is representative of all of the different attachments which may be used.

To facilitate the detachable mounting of the fitting on the tubular upright, the body of the fitting is provided with a tubular stem 127 which is screw threaded upon its outer end for threaded engagement in a nut 128 which is fixed within the upright 105 in alignment with an opening 129 in the wall of the upright. The stem 127 is extended through an adapter fitting or collar 130 which is suitably contoured across one end of the face to conform to the curvature of the outer face of the tubular upright against which it bears and the passage through the collar is, of course, aligned with the opening 129. Thus, when the stem 127 is extended through the adapter fitting or collar and threaded into the nut 128, the whole assembly can be drawn up tight and the collar provides a firm support for the fitting.

The stem 127 may also carry a gasket 130' interposed between the outer end of the adapter fitting and the body of the fitting 122 or other fitting which is mounted on the upright.

The fitting 133 illustrated in detail in FIG. 18 is a suction fitting to which can be attached a base and cleaner head for vacuuming the contaminates that have become water logged and are on the bottom of the pool.

The water and material drawn therewith from the pool by the vacuuming hose may, of course, be passed through the filter portion of the mechanism M and returned to the pool through the fitting 122 or the pool may be emptied when desired, by employing the pump mechanism, in which case the pipe line 120 might be provided with a three-way valve as indicated at 126a, or a special hose adapter used in conjunction with the deck anchor 115 after the ladder has been removed from said anchor.

A particularly important feature of the present invention resides in the fact, as hereinbefore stated, that the pumping and filtering units as conventionally employed in swimming pool structures, instead of being located at remote positions with respect to the pool, can be brought up into close proximity to the pool, as shown in FIG. 14. By placing the pumping and filtering mechanism at this location a simple housing may be placed thereover or the mechanism may even be housed beneath a bench or other similar structure and it is therefore close to the pool where it can be easily reached if any repairs or adjustments become necessary.

The fitting 121 is formed so that it can be closed in a manner similar to the fitting 122 whereby a skimmer device generally designated 131, may be attached to the fitting 132 and operated at the surface of the pool to take off the surface water and any debris floating thereon. Means are provided adjacent to the upper end of the member 104 for the attachment of the skimmer device thereto at the fitting 132.

On the return side of the ladder the upright 105 is provided at a location above the water level of the pool, with a spray fitting which is generally designated 133 and one form of which fitting is illustrated in FIG. 18. While any desired type of spray fitting may be used at this location, the fitting here illustrated includes in its construction a threaded plug 134, which threads into the body 133 and is threaded by grasping the cross-member 136 which has a slot therein thus providing an efficient spray head.

An adjusting fitting 122 controls the amount of water sprayed from the fitting 133. When no spray is desired from this fitting, a plug 134 having no slot, can be provided or a suitable rubber disc can be placed behind the plug 134, as indicated at 135.

This spray fitting 133 is also positioned to set up efficient surface motion to aid the skimmer device.

FIG. 15 illustrates the application of the combined ladder and pumping and filtering system to another type of swimming pool structure. In this other type of swimming pool structure, which pool structure is generally designated 137, the pool walls 138 are set up on the surface of the ground and at their top edges join a fabricated deck structure 139 which is disposed at a substantial elevation above the ground so that there is thus formed beneath the deck structure a chamber 140.

The outer side of the deck structure is here shown as joining an upstanding wall or barricade 141. The ground surface within the waterproof wall structure is also covered with a suitable waterproof floor or basin which is generally designated 142.

In the above ground form of pool shown in FIG. 15 the ladder constructed in accordance with the present invention is generally designated L-8. As in the previous constructions, this ladder comprises the long right and left side members or uprights 143 and 144, which are of tubular form and join at their upper ends with upwardly or outwardly angled, or obtusely angled, grab rail portions 145 and 146 which merge at their upper ends in the reverse bends 147 and 148. One of these reverse bends is continued downwardly in the tubular stanchion 149, while the opposite reverse bend is continued downwardly in a similar tubular stanchion 150.

The uprights 143 and 144 are of materially greater length than the corresponding uprights in the previously described forms as they are intended to be supported upon the floor of the pool and therefore the lower ends of these uprights are closed by the foot members 151, which preferably are in the form of sleeves or caps so as to form a water-tight closure for the lower ends of the uprights. If desired, the ends of the uprights may be bent toward the wall as at 106 and 107 of FIG. 14.

The lower ends of the stanchions 140 and 150 are extended through the fabricated deck 139. Only the stanchion 149 is here illustrated as having its lower end so extended through the fabricated deck 139, and the lower end of the stanchion 150 is likewise extended through the deck so that the stanchions and the other tubular parts with which they are joined can be connected in the pumping and filtering system.

In this figure a combined pumping and filtering mechanism is shown in the chamber 140 below the deck and is generally designated M-1. The numerals 152 and 153 designate respectively the intake and outlet for the mechanism. The intake is connected by a suitable pipe 154, here shown as being in the form of a hose, the other end of the conduit being attached by the coupling 155 with the stanchion 149. The outlet coupling for the mechanism M-1 is connected by a similar pipe or hose 156 with the lower end of the stanchion 150.

The ladder side members have supported therebetween a suitable number of steps or treads 157 and adjacent to the lower step the tubular upright 143 has attached thereto an intake or suction fitting 158 corresponding to the fitting 122 hereinbefore described.

Adjacent to the upper step a fitting 159 corresponding to the fitting 133 hereinbefore described is attached to the suction flow upright 143. A skimmer unit 160 can be attached to this fitting.

The opposite or return flow side of the ladder has attached thereto adjacent to the lower end of the upright 144 the liquid return nozzle or fitting 161 corresponding to the previously described fitting 122.

The side member or upright member 144 also has attached thereto or connected therewith an elevation above the water level of the pool, a spray fitting 162 corresponding to the fitting 133.

In FIGS. 16 and 17 there is illustrated another form of tubular ladder structure by means of which the desired objects of the present invention may be attained in a surface type or above ground type of bathing or swimming pool of the character wherein a waterproof fabric or sheet of plastic or the like is supported by a frame to provide a large size receptacle. Such an above ground pool structure is here generally designated 163 and while it may be of any type of construction, it is here shown as comprising a circular frame structure 164 embodying a series of uprights or posts 165 supporting a ring or rim 166 on their upper ends, with a waterproof fabric or plastic sheet or liner 167 suspended in the frame and having an edge portion 168 secured over the top of the frame.

The ladders designed for use with the above ground pool structure 163 are designated L-8 and L-9. Each of these ladders is in the form of a stile. The stile form ladder L-8 comprises two spaced parallel inner upright members 169 and 170 and the spaced parallel outer members 171 and 172, which inner upright members 169 and 170 are joined at their upper ends respectively to the upright members 171 and 172 by the reverse bends 173 and 174. Thus the inner upright members and the outer upright members with which they are joined comprise a continuous length of tubular material arranged in an inverted V-form. The inner upright members 169 and 170 have connected therebetween in the lower end portions thereof a number of steps 175, one only of which is shown in FIG. 16. The outer members 171 and 172 are also connected by a series of steps 176, here shown as three in number. The steps, of course, as shown maintain the two inverted V-shaped tubular parts of the stile in the proper spaced relation and as will be seen, the inner and outer portions of the structure are adapted to straddle the wall of the above ground pool so that the swimmer or bather may mount the outer steps 176 and step across the pool wall so as to descend into the pool by way of the inner steps 175.

Above the level of the pool wall and of the top steps, the upper ends of the inner and outer uprights function as grab rails whereby the swimmer or bather can support himself in entering or leaving the pool.

Such mechanism has an intake side 179 connected by a hose 180 with one of the outside uprights, here shown as the upright 172, the connection therewith being at 181. The outlet or discharge side 182 of the pumping and filtering mechanism is connected by a conduit or hose 183 with the other one of the outer uprights, here shown as the upright 171, by means of the fitting or coupling 184.

The stile form of the ladder shown in FIG. 17 and designated L-9 is of the same form or structure as the stile L-8 with the exception that a different arrangement is shown for the pumping and filtering mechanism which is here generally designated M-3 and accordingly the same reference characters are applied to the inner and outer uprights as are used in the structure shown in FIG. 16 where the parts are the same.

A lower intake fitting 187 and a skimmer unit 188 are connected with the upright 170 from which the water is withdrawn from the tank, as in previously described structures while the other upright 169 is connected at its lower end with a fitting 189 through which to return water to the tank and at its upper end it has the spray fitting 190 located at a suitable elevation to be positioned above the water level when the stile structure is in straddling relation to the tank wall.

While in the preceding description various embodiments of the ladder structure have been described in association with different types of fittings, the fittings for accomplishing the desired objects may be varied or combined in any manner to suit the pleasure of the person using the system in which the ladder is incorporated. While the fittings shown are designed for utmost efficiency, in the interest of ecenomy drilled holes may be substituted for the fittings for some functions.

There is provided by the present invention a novel compact system which may be installed in substantially any type of swimming or bathing pool at a small expense as compared with the expense of installing conventional systems and which present compact system is combined with a pool ladder in a novel manner and will function to perform all of the different operations necessary in connection with a swimming pool to the maintenance of the pool in proper sanitary condition and also in a condition where maximum comfort may be had by users of the pool. The arrangements disclosed can be used for additional functions, such as including a pool alarm or a sound speaker either with or as a possible substitute for the light. The arrangement can also be used to disperse chemicals into the pool.

I claim:

1. Accessory apparatus for a swimming pool comprising as a complete functional unit and in combination, a ladder structure having at least a part thereof of hollow form, said part of hollow form being constructed to have at least a portion thereof disposed within a pool when the ladder is set up for use, a liquid pumping and filtering mechanism operatively coupled with said part of hollow form for effecting movement of liquid therethrough, and means for establishing communication between the interior of said part and the exterior thereof through which movement of fluid may be effected for the performance of a desired function, and said pumping and filtering mechanism being positioned for operation in relatively close proximity to said ladder structure to provide said complete functional unit wherein the mechanism is conveniently accessible to and readily controlled by a user of the apparatus.

2. Accessory apparatus for a bathing and swimming pool, comprising as a complete functional unit and in combination, a ladder structure having a part of tubular form, said part including a first portion designed to be positioned uprightly in the water of a pool when the ladder is set up for use, said part having a second portion to be located at the outside of the pool, tread members secured to said first portion, means connected with said first portion by which communication between said first part and the exterior thereof is provided for the passage of fluid between the interior of the said part and the exterior thereof, a liquid pumping and filtering means, and conduit means connecting the last stated means with said part of tubular form, and said pumping and filtering means being positioned for operation in relatively close proximity to said ladder structure to provide said complete functional unit wherein the last named means is conveniently accessible to and readily controlled by a user of the apparatus.

3. A water treatment and handling system for a swimming pool, said system comprising as a complete functional unit and in combination, an elongate structure embodying a pair of elongate tubular inner portions adapted to be positioned uprightly in a pool, supporting means for and at the lower ends of said inner portions, a plurality of horizontal elements in vertically spaced relation secured to and between said inner portions and maintaining the latter in spaced apart parallel relation, elongate tubular outer portions, tubular reverse-bend portions connecting the upper ends of said tubular inner portions with the upper ends of said tubular outer portions, said tubular outer portions extending downwardly from said reverse-bend portions in spaced relation with the tubular inner portions to be positioned exteriorly of the pool, said tubular outer portions having supporting means at their lower ends, a liquid pumping and filtering mechanism, liquid inlet and outlet fittings connected with said tubular inner portions, and conduit means connected to and between said pumping and filtering mechanism and a tubular inner portion of the structure, and said pumping and filtering mechanism being positioned for operation in relatively close proximity to said ladder structure to provide said complete functional unit wherein the mechanism is conveniently accessible to and readily controlled by a user of the system.

4. The invention according to claim 3, wherein said inlet and outlet fittings are located adjacent to the bottom ends of the tubular inner portions and there is a liquid discharge fitting upon one tubular inner portion at a location adjacent to the top end thereof to be positioned above level of water in the pool.

5. The invention according to claim 3, wherein said horizontal elements are in a form to function as step treads and wherein said inner tubular portions above the uppermost step tread are directed obliquely upwardly and outwardly to provide grab rails.

6. The invention according to claim 3, wherein the said supporting means at the lower ends of said outer tubular portions are designed to secure the latter to a pool deck.

7. Accessory apparatus for use with an above ground swimming pool having a side wall, said apparatus comprising a stile structure adapted to straddle said side wall and embodying an outer pair of spaced elongate tubular members, an inner pair of spaced elongate tubular members, said inner members and said outer members being in upwardly convergent relation, each of said inner members joined at their upper ends to the upper ends of said outer members by tubular reverse-bend portions, step treads secured to and between the outer tubular members, step treads secured to and between the inner tubular members, said inner and outer tubular members extending upwardly above the uppermost steps secured thereto providing inner and outer grab rails, water intake and discharge fittings communicating with said inner tubular members, water intake and discharge couplings operatively connected to the outer tubular members, and a water pumping and filtering mechanism coupled with said intake and discharge couplings whereby water may be extracted from a pool by way of the intake fittings and tubular members, filtered and returned to the pool by way of said tubular members and discharge fitting.

8. The invention according to claim 7, wherein said water pumping and filtering mechanism is embodied in a unit positioned between the lower end portions of said inner and outer members.

9. Accessory apparatus comprising a ladder structure embodying an inner pair of spaced elongate tubular members, an outer pair of spaced elongate tubular members, said inner members and said outer members being joined at their upper ends by tubular reverse-bend portions, step treads secured to and between the inner tubular members, said inner and outer tubular members extending upwardly above the uppermost step secured thereto providing inner and outer grab rails, water intake and discharge fittings communicating with said tubular members, and a water pumping and filtering mechanism coupled with said intake and discharge couplings.

10. Accessory apparatus for use with a swimming pool having a side wall, said apparatus comprising as a complete functional unit, a ladder structure embodying an outer pair of spaced elongate tubular members and an inner pair of spaced elongate tubular members and said inner members being joined at their upper ends to the upper ends of corresponding outer members by tubular reverse bends, step treads secured to and between the inner tubular members, means for supporting the structure with said inner pair of members within a pool and adjacent to the side wall of the pool and with said inner and outer tubular members extending upwardly above the uppermost one of the steps and providing grab rails, water intake and discharge fittings connected to and communicating with said inner tubular members, water intake and discharge couplings operatively connected to and communicating with the interiors of the outer tubular members and a unitary water pumping and filtering apparatus having water intake and discharge means coupled with said intake and discharge couplings and operative to extract water from a pool by way of said intake fittings and tubular members, filter the water and return the water to the pool by way of said tubular members and discharge fittings, and said pumping and filtering apparatus being positioned in close proximity to said ladder to provide the said complete functional unit wherein the said apparatus is conveniently accessible to and for pool side control by a user of the apparatus.

References Cited in the file of this patent

UNITED STATES PATENTS

| | | |
|---|---|---|
| 145,920 | Watson | Dec. 23, 1873 |
| 252,839 | Levi | Jan. 24, 1882 |
| 289,869 | Spelman | Dec. 11, 1883 |
| 413,881 | Amet | Oct. 29, 1889 |
| 816,900 | Collet | Apr. 3, 1906 |
| 1,016,437 | Perlman | Feb. 6, 1912 |
| 1,762,383 | Booraem | June 10, 1930 |
| 1,792,398 | Rothen | Feb. 10, 1931 |
| 2,143,441 | Jacobs | Jan. 10, 1939 |
| 2,404,202 | Winslow | July 16, 1946 |
| 2,923,954 | Babcock | Feb. 9, 1960 |
| 2,932,397 | Ogden | Apr. 12, 1960 |
| 2,996,729 | Bailey | Aug. 22, 1961 |
| 3,036,712 | Barbara | May 29, 1962 |

FOREIGN PATENTS

| | | |
|---|---|---|
| 348,794 | Great Britain | May 21, 1931 |